(12) United States Patent
Nochi et al.

(10) Patent No.: US 8,258,075 B2
(45) Date of Patent: Sep. 4, 2012

(54) CATALYST FOR TREATING EXHAUST GASES, METHOD FOR PRODUCING THE SAME, AND METHOD FOR TREATING EXHAUST GASES

(75) Inventors: Katsumi Nochi, Hiroshima (JP); Masanao Yonemura, Hiroshima (JP); Yoshiaki Obayashi, Hiroshima (JP); Hitoshi Nakamura, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 297 days.

(21) Appl. No.: 11/864,394

(22) Filed: Sep. 28, 2007

(65) Prior Publication Data

US 2008/0187477 A1  Aug. 7, 2008

(30) Foreign Application Priority Data

Feb. 6, 2007 (JP) .................................. 2007-026581

(51) Int. Cl.
  *B01J 23/00* (2006.01)
  *B01J 21/00* (2006.01)
  *B01J 20/00* (2006.01)
(52) U.S. Cl. ........ 502/339; 502/104; 502/111; 502/113; 502/262; 502/326; 502/327; 502/332; 502/333; 502/334; 502/349; 502/350; 502/351; 502/355; 502/415; 502/439; 502/527.12; 502/527.13
(58) Field of Classification Search .................. 502/261, 502/262, 326, 327, 332, 333, 334, 339, 349, 502/350, 351, 415, 439, 104, 111, 113, 355, 502/527.12, 527.13
See application file for complete search history.

(56) References Cited

U.S. PATENT DOCUMENTS

| | | | |
|---|---|---|---|
| 3,518,206 A | * | 6/1970 | Stiles et al. ...................... 502/64 |
| 3,839,224 A | | 10/1974 | Yonehara et al. |
| 3,928,239 A | * | 12/1975 | Yonehara et al. ............. 502/333 |

(Continued)

FOREIGN PATENT DOCUMENTS

JP  61-93836 A  5/1986

(Continued)

OTHER PUBLICATIONS

Japanese Office Action dated Jul. 28, 2009, issued in corresponding Japanese Patent Application No. 2007-026581.

(Continued)

*Primary Examiner* — Cam N. Nguyen
(74) *Attorney, Agent, or Firm* — Westerman, Hattori, Daniels & Adrian, LLP

(57) ABSTRACT

To provide a catalyst for treating exhaust gases containing nitrogen monoxide, carbon monoxide and volatile organic compounds whose oxidation power has been enhanced without increasing the amount of precious metal supported thereon; a method for producing the same; and a method for treating exhaust gases. A catalyst for treating exhaust gases, including coat layers made up of a plurality of layers, an upper layer of which has an active component contained uniformly therein and a lower layer of which has no active component contained therein, can be obtained through the steps of: forming the lower layer by coating the surface of substrate with a slurry of a porous inorganic compound, followed by drying; and forming the upper layer, which is to be the top surface of the catalyst, by coating the surface of the lower layer with a slurry of a porous inorganic compound that has the active component composed of one or more precious metals supported thereon, followed by drying.

14 Claims, 1 Drawing Sheet

U.S. PATENT DOCUMENTS

| | | | | |
|---|---|---|---|---|
| 4,171,288 A * | 10/1979 | Keith et al. | | 502/304 |
| 4,237,032 A * | 12/1980 | Evans et al. | | 502/303 |
| 4,297,246 A * | 10/1981 | Cairns et al. | | 502/304 |
| 4,537,873 A * | 8/1985 | Kato et al. | | 502/242 |
| 4,757,045 A * | 7/1988 | Turner et al. | | 502/252 |
| 5,063,192 A | 11/1991 | Murakami et al. | | |
| 5,145,825 A * | 9/1992 | Deeba et al. | | 502/242 |
| 5,175,136 A * | 12/1992 | Felthouse | | 502/242 |
| 5,202,299 A * | 4/1993 | Symons et al. | | 502/242 |
| 5,228,308 A | 7/1993 | Day | | |
| 5,272,125 A * | 12/1993 | Weible et al. | | 502/242 |
| 5,334,570 A * | 8/1994 | Beauseigneur et al. | | 502/304 |
| 5,494,878 A | 2/1996 | Murakami et al. | | |
| 5,597,771 A * | 1/1997 | Hu et al. | | 502/304 |
| 5,688,740 A | 11/1997 | Bolshakov et al. | | |
| 5,863,855 A * | 1/1999 | Nojima et al. | | 502/309 |
| 5,989,507 A | 11/1999 | Sung et al. | | |
| 6,069,111 A * | 5/2000 | Yamamoto et al. | | 502/333 |
| 6,071,850 A * | 6/2000 | Friedman et al. | | 502/439 |
| 6,087,298 A * | 7/2000 | Sung et al. | | 502/333 |
| 6,093,378 A * | 7/2000 | Deeba et al. | | 423/213.5 |
| 6,294,140 B1 * | 9/2001 | Mussmann et al. | | 423/213.5 |
| 6,306,794 B1 * | 10/2001 | Suzuki et al. | | 502/304 |
| 6,348,430 B1 * | 2/2002 | Lindner et al. | | 502/304 |
| 6,514,905 B1 * | 2/2003 | Hanaki et al. | | 502/328 |
| 6,589,901 B2 * | 7/2003 | Yamamoto et al. | | 502/65 |
| 6,645,439 B2 * | 11/2003 | Zhang et al. | | 422/177 |
| 6,921,738 B2 * | 7/2005 | Hwang et al. | | 502/240 |
| 7,022,642 B2 * | 4/2006 | Yamamoto | | 502/185 |
| 7,056,859 B2 * | 6/2006 | Hachisuka | | 502/327 |
| 7,208,444 B2 * | 4/2007 | Kikuchi et al. | | 502/300 |
| 7,235,507 B2 * | 6/2007 | Xu et al. | | 502/63 |
| 7,235,511 B2 * | 6/2007 | Kawamoto et al. | | 502/327 |
| 7,276,212 B2 * | 10/2007 | Hu et al. | | 422/177 |
| 7,374,729 B2 | 5/2008 | Chen et al. | | |
| 7,390,770 B2 * | 6/2008 | Nochi et al. | | 502/327 |
| 7,547,656 B2 * | 6/2009 | Miura | | 502/327 |
| 7,576,031 B2 * | 8/2009 | Beutel et al. | | 502/339 |
| 7,601,671 B2 * | 10/2009 | LaBarge | | 502/326 |
| 7,638,460 B2 * | 12/2009 | Nakamura et al. | | 502/326 |
| 7,749,472 B2 | 7/2010 | Chen et al. | | |
| 7,754,171 B2 * | 7/2010 | Chen et al. | | 423/213.2 |
| 2001/0006934 A1 * | 7/2001 | Kachi et al. | | 502/325 |
| 2001/0021358 A1 * | 9/2001 | Kikuchi et al. | | 422/180 |
| 2003/0021745 A1 * | 1/2003 | Chen | | 423/239.1 |
| 2003/0103886 A1 * | 6/2003 | Dou | | 423/239.1 |
| 2004/0001781 A1 * | 1/2004 | Kumar et al. | | 422/180 |
| 2006/0035780 A1 * | 2/2006 | Xu et al. | | 502/66 |
| 2006/0240977 A1 | 10/2006 | Nochi et al. | | |
| 2007/0245724 A1 * | 10/2007 | Dubkov et al. | | 60/299 |
| 2008/0219906 A1 * | 9/2008 | Chen et al. | | 423/213.5 |
| 2008/0229731 A1 * | 9/2008 | Kikuhara et al. | | 60/299 |
| 2009/0042722 A1 * | 2/2009 | Hu et al. | | 502/304 |
| 2009/0111688 A1 * | 4/2009 | Nakamura et al. | | 502/303 |

FOREIGN PATENT DOCUMENTS

| | | | |
|---|---|---|---|
| JP | 2-56247 A | 2/1990 | |
| JP | 9-234378 A | 9/1997 | |
| JP | 10-309462 A | 11/1998 | |
| JP | 2000-511111 A | 8/2000 | |
| JP | 2001-79404 A | 3/2001 | |
| JP | 2002-191989 A | 7/2002 | |
| JP | 3321191 B2 | 9/2002 | |
| JP | 2006-297188 A | 11/2006 | |
| JP | 2007-000749 A | 1/2007 | |

OTHER PUBLICATIONS

Japanese Office Action mailed on Oct. 23, 2009, issued in corresponding Japanese Patent Application No. 2007-026581.

Japanese Office Action dated Oct. 18, 2011, issued in corresponding Japanese Patent Application No. 2007-265681.

Japanese Office Action dated Mar. 9, 2012 (mailing date), issued in corresponding Japanese Patent Application No. 2007-026581.

Japanese Office Action dated Mar. 9, 2012, issued in corresponding Japanese Patent Application No. 2007-026581, (With English Translation, 46 pages).

US Office Action dated Apr. 27, 2012, issued in related U.S. Appl. No. 13/418,500.

* cited by examiner

CATALYST FOR TREATING EXHAUST GASES, METHOD FOR PRODUCING THE SAME, AND METHOD FOR TREATING EXHAUST GASES

BACKGROUND OF THE INVENTION

1. Technical Field

The present invention relates to a catalyst for treating exhaust gases that contain nitrogen monoxide, carbon monoxide and volatile organic compounds, a method for producing the same, and a method for treating exhaust gases.

2. Background Art

Exhaust gases emitted from various industrial products, such as cars and aircraft, and from various factories contain NOx (nitrogen oxides), CO (carbon monoxide) or unburned hydrocarbons. To treat these inclusions, catalysts for treating exhaust gases have been used. For example, a NMHC (Non-Methane Unburned Hydrocarbons) oxidation catalyst that includes: an alumina carrier; and Pt (platinum), as an active component, supported on the alumina carrier is described in Japanese Patent Laid-Open No. 10-309462.

The patent publication describes a method of producing the oxidation catalyst, which includes the steps of: supporting alumina on a substrate having a honeycomb structure by wash-coating; and dipping the substrate having alumina supported on its surface in an aqueous solution of dinitro diammine platinum so that Pt is supported on the alumina.

In this method, however, to enhance the oxidation power of the catalyst, it is necessary to increase the amount of the active component, such as Pt. This means a large amount of an expensive precious metal, such as Pt, has to be used, causing the problem of increasing the production cost.

SUMMARY OF THE INVENTION

In the light of the problem, the object of the present invention is to provide a catalyst for treating exhaust gases whose oxidation power has been enhanced without increasing the amount of precious metal supported thereon, a method for producing the same, and a method for treating exhaust gases.

To achieve the object, one aspect of the present invention is a catalyst for treating exhaust gases that contain nitrogen monoxide, carbon monoxide and volatile organic compounds, comprising coat layers, as a carrier, which includes a porous inorganic compound, wherein the coat layers are made up of a plurality of layers, a upper layer of which is richer in an active component composed of one or more precious metals and a lower layer of which is poorer in such an active component. Preferably, the thickness of the upper layer of the coat layers may be 4 to 30 μm while the thickness of the lower layer of the same may be 20 to 100 μm.

Another aspect of the present invention is a method of producing a catalyst for treating exhaust gases that contain nitrogen monoxide, carbon monoxide and volatile organic compounds, comprising: a step of forming a lower coat layer by coating the surface of a substrate with a slurry of a porous inorganic compound, followed by drying; and a step of forming an upper coat layer, which is to be the surface of the catalyst, by coating the surface of the lower coat layer with a slurry of a porous inorganic compound having one or more precious metals supported thereon, followed by drying. As the porous inorganic compound, a population of particles which have a multi-peak particle size distribution may be preferably used. Preferably, the upper coat layer coated may be calcined after drying.

In the step of forming a lower coat layer, it is preferable to use a slurry of a porous inorganic compound having one or more precious metals supported thereon. In the step of forming the lower coat layer, a slurry of a porous inorganic compound having one or more precious metals supported thereon may be used, and preferably, the amount of the precious metal(s) supported on the porous inorganic compound used in this step may be smaller than that of the precious metal(s) supported on the porous inorganic compound used in the step of forming an upper coat layer. Specifically, the amount of the precious metal(s) supported on the porous inorganic compound used in this step of forming a lower coat layer may be preferably 0.3 to 1.5 g/L, while the amount of the precious metal(s) supported on the porous inorganic compound used in the step of forming an upper coat layer may be 0.3 to 1.5 g/L.

Still another aspect of the present invention is a method of treating exhaust gases using the catalyst for treating exhaust gases to treat nitrogen monoxide, carbon monoxide and volatile organic compounds in exhaust gases.

As described above, according to the present invention, a catalyst for treating exhaust gases is produced so that it comprises coat layers, as a carrier, which includes a porous inorganic compound, wherein the coat layers are made up of a plurality of layers, an upper layer of which is richer in an active component composed of one or more precious metals and a lower layer of which is poorer in such an active component. Thus, the active component can be concentrated and supported on the upper layer, which makes a major contribution to the reaction for exhaust gas treatment, whereby the catalyst is allowed to have an enhanced oxidation power without increasing the amount of precious metal(s) supported thereon.

DETAILED DESCRIPTION OF THE PREFERRED EMBODIMENT

Figure 1:
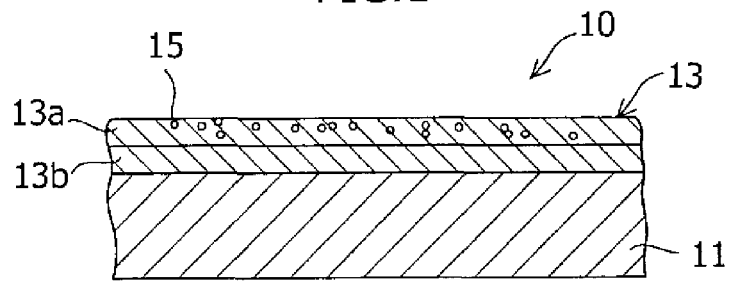
FIG. 1 is a cross sectional view schematically showing one embodiment of the catalyst for exhaust gas treatment according to the present invention.

In the following the catalyst for treating exhaust gases, the method of producing the same and the method of treating exhaust gases according to the present invention will be described in terms of its embodiment. First, a catalyst for treating exhaust gases 10 of this embodiment includes: a substrate 11, and coat layers 13, as a carrier, which include a porous inorganic compound and are formed on the substrate 11, as shown in FIG. 1. The coat layers 13 are made up of a plurality of layers, a upper layer 13a of which contains an effective amount of an active component 15 composed of one or more precious metals, and a lower layer 13b of which contains no active component 15.

As a porous inorganic compound that is a constitute of the carrier, at least one selected from the group consisting of $SiO_2$, $Al_2O_3$, $TiO_2$, $ZrO_2$, $SiO_2$—$Al_2O_3$, $TiO_2$—$SiO_2$, $TiO_2$—$Al_2O_3$, $TiO_2$—$ZrO_2$, $SO_4/ZrO_2$, $SO_4/TiO_2$, and $SO_4/TiO_2$—$ZrO_2$ may be suitable. The carrier including a porous inorganic compound preferably may have a BET specific surface area of 50 m$^2$/g or more. If the specific surface area is in such a range, the active component can be supported on the carrier in a highly dispersed manner.

The carrier including a porous inorganic compound preferably may have a double-peak particle size distribution. In the carrier having such a particle size distribution, smaller particles of the carrier enter the spaces among larger particles of the same, whereby the carrier particles are closely packed in the coat layers. Thus, the adhesion between the particles can be enhanced, whereby the coat layers can be prevented from separating from each other.

The carrier including a porous inorganic compound is coated on the substrate 11 as a plurality of layers, which means at least two layers. One example of methods for coating a plurality of layers includes the steps of: preparing a slurry of the compound, applying the slurry to the substrate by, for example, wash-coating, drying the coating, and again applying the slurry to the dried coating and, if necessary, repeating the steps.

Examples of the substrate 11 include honeycomb structures (monolithic structures) made of ceramic, such as cordierite, and honeycomb structures (monolithic structures) made of stainless steel. As a main component of the porous inorganic compound(s), at least one selected from the group consisting of $SiO_2$, $Al_2O_3$, $TiO_2$, $ZrO_2$, $SiO_2$—$Al_2O_3$, $TiO_2$—$SiO_2$, $TiO_2$—$Al_2O_3$, $TiO_2$—$ZrO_2$, $SO_4/ZrO_2$, $SO_4/TiO_2$, and $SO_4/TiO_2$—$ZrO_2$ may be suitable.

As a precious metal that constitutes the active component 15, at least one selected from the group consisting of Ir, Rh, Ru, Pt, Pd, Ag, Au and oxides thereof may be suitable. Preferably, the active component 15 may have a particle size of 50 nm or less. One example of methods for allowing the active component having such a particle size to be supported on the porous inorganic compound includes the steps of: preparing a colloidal solution of a precious metal(s); and allowing the colloidal solution to be supported on the porous inorganic compound by spray drying, vaporization to dryness, or adsorption. The particle size may be more preferably 2 to 15 nm.

A method of preparing a colloidal solution of a precious metal will be described. An aqueous solution where a salt of a precious metal, preferably a nitrate, chloride, acetate or complex salt has been dissolved is added to a mixture of water, a reducing agent and a polymer material. The mixture can be prepared either by dissolving a polymer material in water and then introducing a reducing agent, or by introducing a mixed solution of a reducing agent and a polymer material into an aqueous solution containing no polymer material. In either procedure, preferably, water used may be boiled so that oxygen dissolved in the water can be removed before use. The oxygen dissolved in the water may be removed by boiling the water, after a polymer material and a reducing agent are mixed in the water.

As a compound which can be used as a reducing agent, an organic acid may be preferably used. Examples of compounds used as a reducing agent include: sodium citrate; potassium citrate; carboxylic acids such as acetic acid, formic acid and malic acid; alcohols such as methanol, ethanol and propanol; ethers such as diethyl ether; and ketones such as methyl ethyl ketone. Examples of compounds used as a polymer material include: water-soluble polymers such as poly(vinyl alcohol), polyvinylpyrrolidone and poly(methyl vinyl ether).

The concentration of the precious metal in the colloidal solution may be preferably in the range of 0.01 to 1.0% by weight. The concentration of the reducing agent may be preferably in the range of 35 to 80% by weight. Keeping the concentration in the range of 35 to 80% by weight makes it possible to prepare a colloidal solution of a precious metal stably. The concentration of the polymer material may be preferably in the range of 0.05 to 3.0% by weight. If the concentration is lower than 0.05% by weight, the precious metal colloid can become unstable and is more likely to cause aggregation and precipitation of precious metal. On the other hand, if the concentration is higher than 3.0% by weight, the precious metal colloid can be coated with a larger amount of polymer material, whereby the size of the particles of the precious colloid together with the polymer material can increase, and thus, the colloid can be less likely to be adsorbed on the porous inorganic compound. In addition, it can take longer to remove the polymer material from the colloid by calcining. Thus, the concentration of the polymer material higher than 3.0% by weight may not be preferable.

Then, the aqueous solution prepared by adding an aqueous solution of a precious metal salt to the mixture is subjected to reduction treatment. Generally, the reduction reaction is allowed to proceed by heating the aqueous solution to about 80° C. to about 95° C. In the reduction reaction, precious metal colloidal particles are formed by the reduction reaction of the precious metal dissolved in the aqueous solution in the form of ion and a precious metal colloidal solution is prepared by the termination of the reaction. The metal colloid is coated with the polymer material, therefore, it neither aggregates nor precipitates and exists stably.

Then, a method will be described of allowing an active component to exist in the upper layer 13a, one of the plurality of coat layers. The coat layer is formed by coating a slurry of a porous inorganic compound, as described above, and to form the upper layer 13a, a slurry of a porous inorganic compound with a precious metal supported on its surface is used. A porous inorganic compound is allowed to support a precious metal by, for example, spray drying, vaporization to dryness, or adsorption of a colloidal solution of the precious metal on the compound.

Preferably, the upper layers 13a where an active component exists are formed so that their thickness, measured from the outermost surface of the coat layers, can be 4 to 30 μm. If the upper layer has such thickness, an active component can be supported on the layer that contributes largely to the reaction of exhaust gas treatment, of the plurality of coat layers, and thus the catalyst can exhibit a high catalytic activity using a smaller amount of active component. To obtain an upper layer 4 to 30 μm thick, suitably the amount of the slurry coated may be 8.5 to 12.0 g/m². The thickness of the upper layer may be more preferably 4 to 20 μm, and to obtain an upper layer of the thickness, suitably the amount of the slurry coated may be 8.5 to 11.5 g/m².

In the slurry, which is used for forming the upper layer, of a porous inorganic compound with a precious metal supported on its surface, the blend ratio of the precious metal to the porous inorganic compound may be preferably in the range of 1:100 to 9:100. Keeping the blend ratio in this range makes the oxidation reaction of the catalyst effective while avoiding a significant decrease in performance of the catalyst even after long-term use. The blend ratio of the precious metal to the porous inorganic compound may be more preferably in the range of 1.5:100 to 3:100.

A conventional method of supporting an active component on a carrier includes forming the carrier on a substrate by wash-coating or the like, and impregnating the substrate with an aqueous solution of a precious metal, thereby allowing the carrier to adsorb and support a precious metal. The conventional method poses the problem of the precious metal being supported non-uniformly across the length of the catalyst. However, the method, in which a slurry of a porous inorganic compound with a precious metal supported on its surface is coated on a substrate, makes it possible to enhance the dispersibility of the precious metal.

The lower layer 13b is preferably such that its thickness, from the bottom surface of the coat layer (that is, the surface in contact with the substrate) to the upper layer, is 20 to 100 μm. Forming the lower layer having such thickness makes it possible to add, to a catalyst, a carrier in an amount sufficient for the carrier to dilute and adsorb the poisoning matter contained in exhaust gases. To obtain a lower layer 20 to 100 μm thick, suitably the amount of the slurry coated may be 34 to 46 g/m². The single lower layer 13b may be formed, as shown in FIG. 1. A plurality of lower layers also may be formed.

Preferably, the amount of the active component supported may be 0.3 to 1.5 g/L, with respect to a honeycomb structure. Keeping the amount of the active component supported in this range allows the catalyst to exhibit high oxidation power with a smaller amount of the precious metal. More preferably, the amount of the active component supported may be 0.5 to 0.7 g/L.

A catalyst for exhaust gas treatment 10 having an active component 15 on its upper layer 13a alone can be obtained by drying the substrate 11 having slurries for the lower layer 13b and the upper layer 13a coated thereon and, if necessary, calcining the same. The calcining temperature may be preferably 400 to 550° C. If necessary, a very small amount of the active component may be allowed to exist in the lower layer of the coat layers, though the catalyst obtained by the production method in accordance with this embodiment has no active component existing in its lower coat layer. When allowing a very small amount of the active component to exist in the lower layer, the amount of the active component may be preferably 0.1 to 0.7 g/L, with respect to a honeycomb structure.

Figure 2:
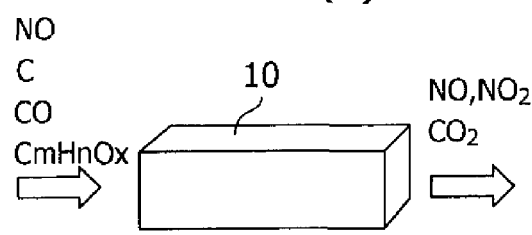
FIG. 2 is a flow chart showing one embodiment of the method of treating exhaust gases according to the present invention.
Figure 2:
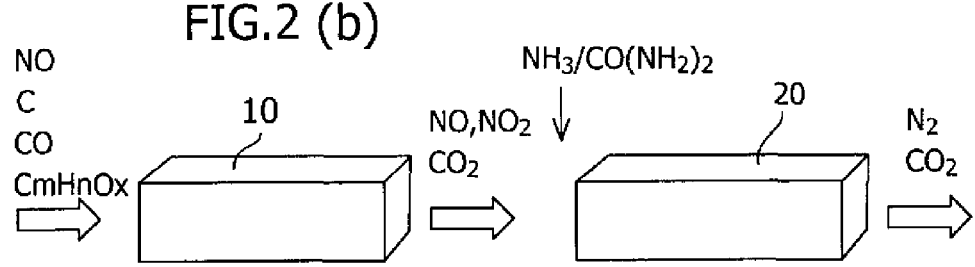
Figure 2:
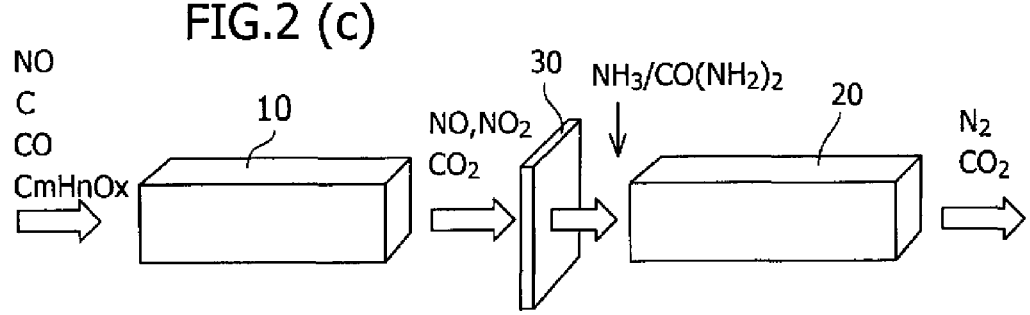

In the following, a method of treating exhaust gases using a catalyst for exhaust gas treatment obtained as will be described with reference to FIG. 2. As shown in FIG. 2(a), a catalyst for exhaust gas treatment 10 oxidation-treats nitrogen monoxide, carbon (PM), carbon compounds (CO, CmHnOx) in exhaust gases. The reaction formulae are illustrated below. For hydrocarbons, the reaction formula of $C_2H_4$ is described.

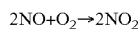
$$2NO+O_2 \rightarrow 2NO_2$$

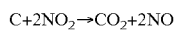
$$C+2NO_2 \rightarrow CO_2+2NO$$

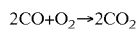
$$2CO+O_2 \rightarrow 2CO_2$$

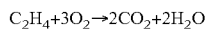
$$C_2H_4+3O_2 \rightarrow 2CO_2+2H_2O$$

If a catalyst for treating nitrogen oxide 20 is installed downstream of the exhaust gas having been treated by the catalyst for exhaust gas treatment 10 and ammonium or urea is added to the exhaust gas at the gas inlet of the catalyst for treating nitrogen oxide 20, as shown in FIG. 2(b), nitrogen oxides can be treated which is still contained in the gas having been treated by the catalyst for exhaust gas treatment 10.

Further, if a black smoke removing filter 30 is installed between the catalyst for exhaust gas treatment 10 and the catalyst for treating nitrogen oxide 20, as shown in FIG. 2(c), carbon (PM) can be trapped in the black smoke removing filter 30 which is still contained in the gas having been treated by the catalyst for exhaust gas treatment 10. The carbon trapped in the black smoke removing filter 30 can be oxidized by the nitrogen dioxide contained in the gas and removed as carbon dioxide, whereby the black smoke removing filter 30 can be recycled.

As described so far, the catalyst for exhaust gas treatment of the present invention is capable of oxidation-treating nitrogen monoxide, carbon or carbon compounds (CO, CmHnOx) in exhaust gases, and therefore, being suitable for treatment of exhaust gases from lean burn gas engines, gas turbines or diesel engines.

EXAMPLES

A catalyst for exhaust gas treatment was prepared through the following procedure.

Example 1

Preparation of Pt Colloidal Solution

To 1.5 L of ion-exchanged water, 1.5 L of ethanol and 32 g of polyvinyl alcohol (average polymerization degree: 900 to 1100) were added to prepare 3 L of mixed solution. The mixed solution was then boiled for 1 hour to remove oxygen dissolved in the solution. To this mixed solution, 0.1 L of dinitro diammine platinum was added to prepare a precious metal-containing aqueous solution (Pt: 75 mmol). This aqueous solution was subjected to reduction treatment with its temperature kept at about 90° C. After confirming the color of the solution had changed to black, the solution was cooled on ice to prepare a Pt colloidal solution. The pH value of the solution was 1.

Preparation of Pt-Supporting Alumina Slurry

A Pt-supporting alumina slurry was prepared by: allowing 1500 g of γ-alumina ($Al_2O_3$) in a powder form, which is an active porous inorganic compound having a BET specific surface area of 113 m²/g, to support 8800 g of a Pt colloidal solution obtained by spray-drying; calcining the γ-alumina with Pt colloidal solution supported on its surface; followed by wet ball milling at 100 rpm for 8 hours.

Preparation of Alumina Slurry

An alumina slurry was prepared by wet-ball-milling 1500 g of γ-alumina ($Al_2O_3$) in a powder form, which is an active porous inorganic compound having a BET specific surface area of 113 m²/g, at 100 rpm for 8 hours.

(Allowing Substrate to Support Slurry)

A ceramic honeycomb substrate (50 mm long×50 mm wide×50 mm high) was dipped in the alumina slurry obtained as so that the substrate was coated with γ-alumina ($Al_2O_3$) in a coating amount of 40 g/m² (the thickness of the coat layer: 65 μm). The substrate coated with γ-$Al_2O_3$ was dried and then dipped in the Pt-supporting alumina slurry obtained as so that the substrate was coated with Pt/γ-$Al_2O_3$ in a coating amount of 10 g/m². The substrate coated with Pt/γ-$Al_2O_3$ was dried at 110° C. and then calcined at 500° C. for 5 hours to give a catalyst having two alumina coat layers, the outermost of which alone has Pt supported therein (Example 1). The thickness of the outermost coat layer was in the range of 4 to 20 μm due to non-uniform coating.

Example 2

A catalyst having two titania coat layers, the outermost layer of which alone has Pt supported therein (Example 2), was obtained in the same manner as in Example 1, except that titania ($TiO_2$) in a powder form, which is an active porous inorganic compound having a BET specific surface area of 50 m²/g, was used instead of the alumina.

Example 3

A catalyst having two alumina coat layers, the outermost layer of which alone has Pt supported therein, (Example 3)

was obtained in the same manner as in Example 1, except that γ-alumina ($Al_2O_3$) in a powder form, which is an active porous inorganic compound having a BET specific surface area of 113 m²/g and whose particle size distribution has two peaks, was used instead of the alumina.

Comparative Example 1

Preparation of Pt Colloidal Solution

A Pt colloidal solution was prepared by the same procedure as in Example 1.
Allowing Substrate to Support Slurry First, 4000 cc of an aqueous solution that contains 0.07 wt %, with respect to the total weight of the aqueous solution, of the Pt colloid was prepared, and then a honeycomb substrate coated with γ-$Al_2O_3$ having a BET specific surface area of 113 m²/g in an amount of 50 g/m² (50 mm long×50 mm wide×50 mm high) was dipped in the prepared aqueous solution for 30 minutes so that the honeycomb substrate was allowed to support a prescribed amount of Pt. The ratio of the weight of polyvinyl alcohol to the total weight of the aqueous solution was 0.16 wt %. And the pH value was 2.6. The catalyst having Pt supported in its coat layer was dried at 110° C. and calcined at 500° C. for 5 hours to give a catalyst having Pt supported in its alumina coat layer, as a single layer (Comparative Example 1). Visual observation confirmed that the catalyst was uniformly colored black.

Comparative Example 2

A catalyst having Pt supported in its titania coat layer, as a single layer, was obtained through the same procedure as in Comparative Example 1, except that titania ($TiO_2$) in a powder form, which is an active porous inorganic compound having a BET specific surface area of 50 m²/g, was used instead of the alumina.

Then, a reaction rate evaluation test was conducted for each of the catalysts, in Examples 1 to 3 and Comparative Examples 1 to 2 under the conditions described below. The test was performed using pieces of the catalyst which were cut from the respective catalysts of Examples and Comparative Examples for evaluation. The results are shown in Table 1. The test revealed that the catalysts of Examples 1 to 3 exhibited superior catalytic activity to catalysts of Comparative Examples 1 to 2, though the former catalysts and the latter ones had the same amount of the active component supported on them. The reason that the catalyst of Example 3 was allowed to have a further improved catalytic activity is probably that in the catalyst of Example 3, particles were packed in a more desirable manner and the thickness of the coat layer a little decreased, whereby the area coming in contact with gases increased. Hydrocarbons as volatile organic compounds can include all the organic compounds but $CH_4$ and $C_2H_6$; however, in this evaluation, $C_2H_4$ was used as a representative organic compound.

The conditions under which the reaction rate evaluation test was conducted were as follows. CO: 65 ppm, $C_2H_4$: 13 ppm, NOx: 65 ppm, $O_2$: 15%, $CO_2$: 5%, $H_2O$: 7%, $N_2$: the balance, GHSV: 352,000 h$^{-1}$, 272,000 h$^{-1}$ or 136,000 h$^{-1}$, amount of gases: 17 Nm³/h or 200 NL/h, temperature of catalyst layer: 200° C., 300° C. and 400° C.

The reaction rates of the gases are expressed by the following formulae.

Reaction rate of CO (%)=(1−CO concentration at outlet/CO concentration at inlet)×100

Reaction rate of $C_2H_4$ (%)=(1−$C_2H_4$ concentration at outlet/$C_2H_4$ concentration at inlet)×100

Reaction rate of NO (%)=(1−NO concentration at outlet/NO concentration at inlet)×100

TABLE 1

| Examples | Active component Kind | Supporting layer | Amount (g/L) | Support composition | Mixing of particles | BET specific surface area (m²/g) | GHSV (h$^{-1}$) | Reaction rate at different temperatures (%) 200° C. | | | 300° C. | | | 400° C. | | |
|---|---|---|---|---|---|---|---|---|---|---|---|---|---|---|---|---|
| | | | | | | | | $C_2H_4$ | CO | NO | $C_2H_4$ | CO | NO | $C_2H_4$ | CO | NO |
| Example 1 | Pt | Upper layer | 0.5 | γ-$Al_2O_3$ | not done | 113 | 352000 | 46.3 | 66.7 | 3.0 | 55.8 | 73.9 | 15.0 | 61.0 | 74.5 | 23.6 |
| Example 2 | Pt | Upper layer | 0.3 | $TiO_2$ | not done | 50 | 272000 | 33.4 | 52.3 | — | 35.3 | 53.1 | — | 38.0 | 55.3 | — |
| | | | | | | | 136000 | — | — | 2.0 | — | — | 10.0 | — | — | 17.0 |
| Example 3 | Pt | Upper layer | 0.5 | γ-$Al_2O_3$ | done | 113 | 352000 | 52.3 | 70.2 | 3.0 | 55.8 | 74.1 | 14.8 | 60.9 | 75.6 | 22.9 |
| Comparative Example 1 | Pt | Single layer | 0.5 | γ-$Al_2O_3$ | not done | 113 | 352000 | 39.4 | 64.8 | 1.6 | 50.5 | 72.0 | 8.6 | 53.6 | 73.0 | 15.2 |
| Comparative Example 2 | Pt | Single layer | 0.3 | $TiO_2$ | not done | 50 | 272000 | 32.5 | 50.2 | — | 33.2 | 52.3 | — | 35.5 | 53.3 | — |
| | | | | | | | 136000 | — | — | 0.0 | — | — | 8.0 | — | — | 14.0 |

What is claimed is:

1. A method of producing a catalyst for treating exhaust gases that contain nitrogen monoxide, carbon monoxide and volatile organic compounds, comprising:
    forming a lower coat layer having a thickness of 20 to 100 μm by coating the surface of a substrate with a slurry of a porous inorganic compound, followed by drying;
    preparing a colloidal solution of one or more precious metals;
    allowing the one or more precious metals to be supported on a porous inorganic compound by using the colloidal solution;
    preparing a slurry of the porous inorganic compound having the one or more precious metals supported thereon; and
    forming an upper coat layer having a thickness of 4 to 30 μm, which is to be the top surface of the catalyst, by coating the surface of the lower coat layer with the slurry, followed by drying;
    wherein a population of particles that have a multi-peak particle size distribution is used as the porous inorganic compound.

2. The method of producing a catalyst for treating exhaust gases according to claim 1, wherein in the step of forming an upper coat layer, calcining is performed after the drying.

3. The method of producing a catalyst for treating exhaust gases according to claim 2, wherein in the step of forming a lower coat layer, a slurry of a porous inorganic compound having one or more precious metals supported thereon is used as the slurry of a porous inorganic compound, and the amount of the precious metal(s) supported on the porous inorganic compound used in the step of forming a lower coat layer is smaller than that of the precious metal(s) supported on the porous inorganic compound used in the step of forming an upper coat layer.

4. The method of producing a catalyst for treating exhaust gases according to claim 3, wherein in the step of forming a lower coat layer, a slurry of a porous inorganic compound having one or more precious metals supported thereon is used as the slurry of a porous inorganic compound and the amount of the precious metal(s) supported on the porous inorganic compound used in the step of forming a lower coat layer is 0.3 to 1.5 g/L, while the amount of the precious metal(s) supported on the porous inorganic compound used in the step of forming an upper coat layer is 0.3 to 1.5 g/L.

5. The method of producing a catalyst for treating exhaust gases according to claim 2, wherein in the step of forming a lower coat layer, a slurry of a porous inorganic compound having one or more precious metals supported thereon is used as the slurry of a porous inorganic compound and the amount of the precious metal(s) supported on the porous inorganic compound used in the step of forming a lower coat layer is 0.3 to 1.5 g/L, while the amount of the precious metal(s) supported on the porous inorganic compound used in the step of forming an upper coat layer is 0.3 to 1.5 g/L.

6. The method of producing a catalyst for treating exhaust gases according to claim 1, wherein in the step of forming a lower coat layer, a slurry of a porous inorganic compound having one or more precious metals supported thereon is used as the slurry of a porous inorganic compound, and the amount of the precious metal(s) supported on the porous inorganic compound used in the step of forming a lower coat layer is smaller than that of the precious metal(s) supported on the porous inorganic compound used in the step of forming an upper coat layer.

7. The method of producing a catalyst for treating exhaust gases according to claim 6, wherein in the step of forming a lower coat layer, a slurry of a porous inorganic compound having one or more precious metals supported thereon is used as the slurry of a porous inorganic compound and the amount of the precious metal(s) supported on the porous inorganic compound used in the step of forming a lower coat layer is 0.3 to 1.5 g/L, while the amount of the precious metal(s) supported on the porous inorganic compound used in the step of forming an upper coat layer is 0.3 to 1.5 g/L.

8. The method of producing a catalyst for treating exhaust gases according to claim 1, wherein in the step of forming a lower coat layer, a slurry of a porous inorganic compound having one or more precious metals supported thereon is used as the slurry of a porous inorganic compound and the amount of the precious metal(s) supported on the porous inorganic compound used in the step of forming a lower coat layer is 0.3 to 1.5 g/L, while the amount of the precious metal(s) supported on the porous inorganic compound used in the step of forming an upper coat layer is 0.3 to 1.5 g/L.

9. The method of producing a catalyst for treating exhaust gases according to claim 1, wherein the step of preparing the colloidal solution comprises mixing an aqueous solution of a salt or salts of the one or more precious metals with water, a reducing agent and a polymer material; and
   subjecting the mixture to a reduction treatment to form colloidal particles of the precious metal.

10. The method of producing a catalyst for treating exhaust gases according to claim 9, wherein the reducing agent comprises an organic acid.

11. The method of producing a catalyst for treating exhaust gases according to claim 10, wherein the polymer material comprises a water-soluble polymer.

12. The method of producing a catalyst for treating exhaust gases according to claim 1, wherein the step of allowing the precious metal to be supported on the porous inorganic compound comprises spray drying, vaporization to dryness, or adsorption of the colloidal solution.

13. A method of producing a catalyst for treating exhaust gases that contain nitrogen monoxide, carbon monoxide and volatile organic compounds, comprising:
   forming a lower coat layer having a thickness of 20 to 100 μm by coating the surface of a substrate with a slurry of a porous inorganic compound, followed by drying;
   preparing a colloidal solution of one or more precious metals;
   allowing the one or more precious metals to be supported on a porous inorganic compound by using the colloidal solution;
   preparing a slurry of the porous inorganic compound having the one or more precious metals supported thereon; and
   forming an upper coat layer having a thickness of 4 to 30 μm, which is to be the top surface of the catalyst, by coating the surface of the lower coat layer with the slurry, followed by drying;
   wherein in the step of forming a lower coat layer, a slurry of a porous inorganic compound having one or more precious metals supported thereon is used as the slurry of a porous inorganic compound, and the amount of the precious metal(s) supported on the porous inorganic compound used in the step of forming a lower coat layer is smaller than that of the precious metal(s) supported on the porous inorganic compound used in the step of forming an upper coat layer.

14. The method of producing a catalyst for treating exhaust gases according to claim 13, wherein in the step of forming a lower coat layer, a slurry of a porous inorganic compound having one or more precious metals supported thereon is used as the slurry of a porous inorganic compound and the amount of the precious metal(s) supported on the porous inorganic compound used in the step of forming a lower coat layer is 0.3 to 1.5 g/L, while the amount of the precious metal(s) supported on the porous inorganic compound used in the step of forming an upper coat layer is 0.3 to 1.5 g/L.

* * * * *